H. B. PAUL.
Trotting-Sulky.
No. 206,606.      Patented July 30, 1878.
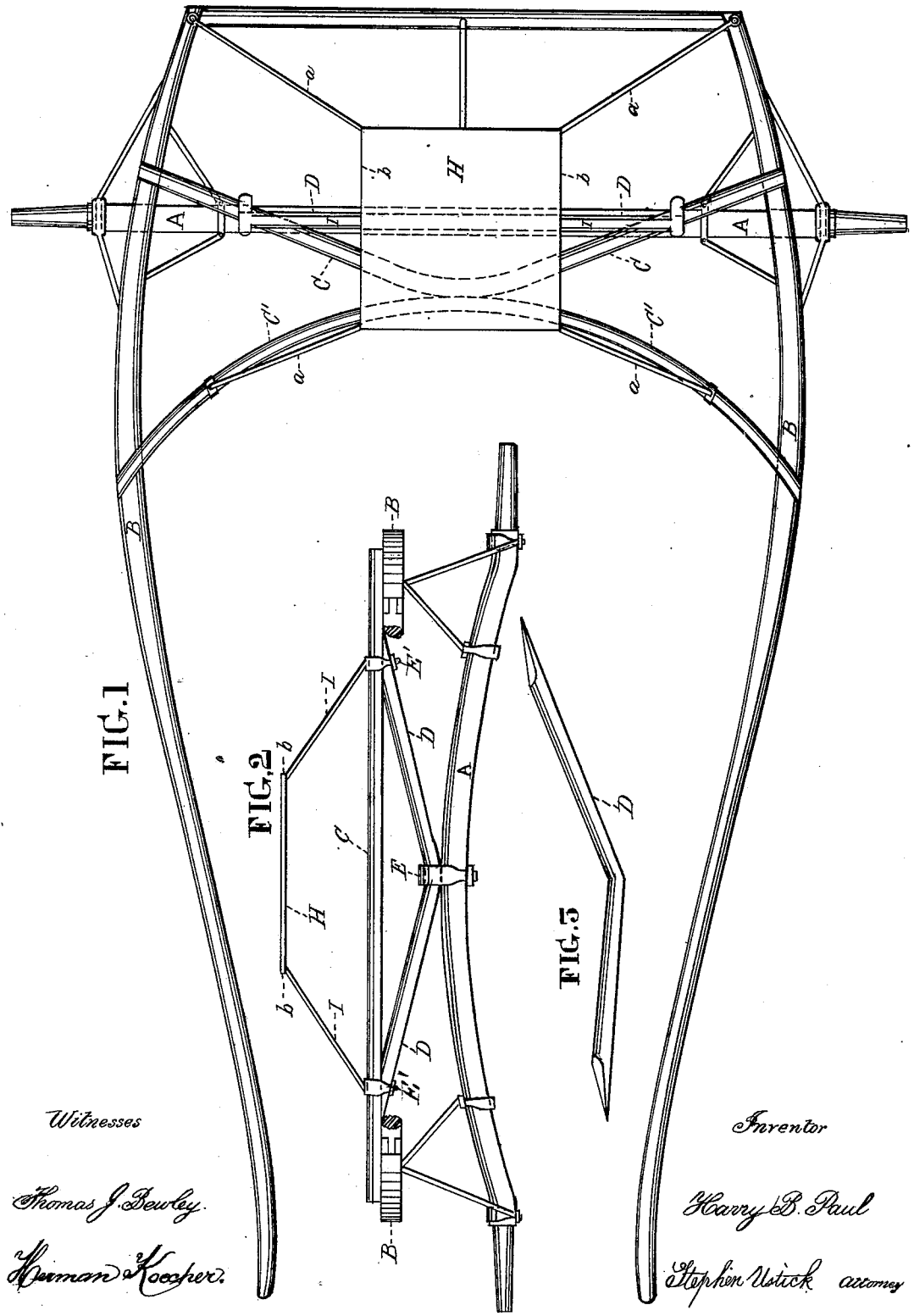

UNITED STATES PATENT OFFICE.

HARRY B. PAUL, OF CAMDEN, NEW JERSEY, ASSIGNOR OF ONE-HALF HIS RIGHT TO CHARLES S. CAFFREY, OF SAME PLACE.

IMPROVEMENT IN TROTTING-SULKIES.

Specification forming part of Letters Patent No. 206,606, dated July 30, 1878; application filed July 10, 1878.

*To all whom it may concern:*

Be it known that I, HARRY B. PAUL, of the city of Camden, in the county of Camden and State of New Jersey, have invented a new and useful Combined Axle-Brace and Seat-Stay for Trotting-Sulkies, of which the following is a specification:

On account of the upward swell of sulky-axles a great strain is sometimes thrown upon its middle part. The object of my invention is to give additional strength to this part without increasing the weight of the axle.

The nature of the invention consists in the connection of a brace with the middle of the axle and with the rear cross-bar by means of clips or other suitable means, or with the shafts near the bar.

It also consists in the combination of seat-stays with the end clips of the brace.

In the accompanying drawings, Figure 1 is a plan view of the axle A, shafts B B, and parts in connection therewith. Fig. 2 is a rear view of the same. Fig. 3 is a perspective view of the brace D.

Like letters of reference in all the figures indicate the same parts.

In reference to the drawings, A is the axle of the sulky, and B B the shafts. C is the back cross-bar, and C' the front cross-bar. D is a brace for stiffening the middle of the axle. The brace is fastened firmly in its middle to the middle of the axle, and at its ends to the rear cross-bar C, near the shafts B B; or the ends of the brace may extend to the shafts and be connected thereto.

E is a clip, which confines the middle of the brace to the axle, and E' E' similar clips, which confine its ends to the rear cross-bar C. When the ends of the brace extend to the shafts I connect them with similar clips E'.

The brace D is shown detached in Fig. 3.

H is the seat, having the usual stays $a$. Besides these it has stays I I, which extend from the end clips E' E' of the brace D to the parallel edges $b\ b$ of the seat, for increasing the stiffness of the axle in its vertical plane.

I claim as my invention—

1. The brace D, in combination with the axle A, connected at its middle with the axle and at its ends with the rear cross-bar C, or with the shafts B B near said cross-bar, substantially as and for the purpose set forth.

2. The combination of the clips E' E' with the brace D and the cross-bar C, or with the shafts near the bar, substantially as and for the purpose set forth.

3. The combination of the stays I I with the seat H and the end clips E' E' of the brace D, substantially as set forth.

HARRY B. PAUL.

Witnesses:
STEPHEN USTICK,
THOMAS J. BEWLEY.